United States Patent [19]

Walker et al.

[11] 4,152,113

[45] May 1, 1979

[54] SYSTEM FOR DYEING HOSIERY GOODS

[75] Inventors: Moses A. Walker; William B. Crane, both of Winston-Salem, N.C.

[73] Assignee: Hanes Corporation, Winston-Salem, N.C.

[21] Appl. No.: 872,730

[22] Filed: Jan. 26, 1978

[51] Int. Cl.$^2$ .............................................. D06P 5/00
[52] U.S. Cl. ............................................. 8/17; 8/80; 8/81; 8/158
[58] Field of Search ........................ 8/17, 80, 81, 158

[56] References Cited

U.S. PATENT DOCUMENTS

| | | | |
|---|---|---|---|
| 3,507,423 | 4/1970 | Swindall | 223/76 |
| 3,829,380 | 8/1974 | Oohara | 210/30 |
| 3,841,116 | 10/1974 | Klein | 68/12 R |
| 3,927,965 | 12/1975 | Lasas | 8/89 |
| 3,944,383 | 3/1976 | Davis | 8/80 |

*Primary Examiner*—A. Lionel Clingman
*Attorney, Agent, or Firm*—Charles Y. Lackey; William S. Burden

[57] ABSTRACT

A system for continuously reusing and recycling water and chemicals in consecutive dyeing cycles wherein hosiery goods are placed in a vat and subjected to dyeing, rinsing and finishing operations. The unabsorbed dye bath, rinse waste water and finish waste water are continuously recirculated to eliminate waste discharge to municipal sewage facilities. The waste waters are clarified in a treatment zone, and the unspent dye bath is continuously recirculated or periodically clarified as necessary or desirable. Treatment of the waste waters and the unabsorbed dye bath removes dyes while permitting certain chemical constituents to remain in the clarified water for reuse in subsequent dyeing cycles.

13 Claims, 2 Drawing Figures

SYSTEM FOR DYEING HOSIERY GOODS

BRIEF SUMMARY AND OBJECTS OF THE INVENTION

This invention relates generally to the dyeing of fibrous textile hosiery goods, and more particularly to a unique recirculation system for the spent dye bath and the spent rinse and finish waste waters. A portion of the chemical constituents utilized in the dye bath and the finish water are retained in the clarified water for reuse in subsequent dyeing cycles. The dye bath may be continuously recirculated in successive dyeing cycles, or may be periodically clarified to remove dye therefrom for recirculation within the dyeing system. Such recirculation eliminates exhaustion of wastes to municipal waste water treatment facilities, thus alleviating pollution and environmental problems caused by such practices, and conserving natural resources(energy).

The invention will be described hereinbelow primarily with reference to the dyeing of hosiery or hosiery goods. It is to be understood, however, that reference to hosiery or hosiery goods is not to be construed as an indication that the invention is so limited, but is intended to include one piece articles or garments such as panty hose, tights, ladies conventional stockings, knee high garments and the like.

Upon dyeing of hosiery goods, the dye bath unabsorbed by the hosiery goods is removed from the dye vat or container and directed to a waste water holding tank. Subsequently, spent rinse and finish waters are transferred from the vat to a waste water holding tank after the various rinse and finish operations. Periodically, the waste fluids are directed to a treatment zone where they are clarified sufficiently for utilization in the dye bath, rinse and finish operations in subsequent dyeing cycles. Therefore, all unabsorbed dye bath and waste waters are continuously recycled in a closed loop system, completely eliminating disposal of any waste water and disposal of dyes and chemicals to a municipal sewage facility. Only make-up water need be added to the system, as required.

Alternatively, the unabsorbed dye waste may be directed to waste water holding tank separate from that for receiving the rinse waste waters. The dye waste or unabsorbed dye bath is analyzed for dye color and content upon completion of a dyeing cycle prior to being combined with hosiery goods in the vat for initiating another dyeing cycle. As a result of analyzing the unabsorbed dye bath, additional dyes may be added, if required, to the dye bath before initiating the next cycle. In addition to recirculation the dye bath, clean or clarified water may cascade from a supply to the vat for a finish operation of one cycle, and to the vat again for the second rinsing operation in the following or second cycle. The spent waste water of the second rinsing operation is removed from the vat, and during a third dyeing cycle, may be transferred back to the vat as rinse water in the first rinse operation for a third batch of goods in a third dyeing cycle. Rinse waste water from the first rinsing of dyed goods may be directed to the unabsorbed dye bath as make-up water to replace the dye bath absorbed by and retained in the dyed goods as they are removed from the vat.

In analyzing the dye bath, a micro-process analyzer and printer may be utilized to compare the dye content of the untreated, unabsorbed dye bath, after a dyeing cycle, with the dye content of a selected, standard dye bath before dyeing of goods to determine the quantities and colors of dyes to be added before initiating dyeing of other goods.

Treatment of the rinse and finish waste waters and the waste dye bath clarifies the water sufficiently, to achieve a constant character for recirculation through the various operations while maintaining dyeing quality.

One of the primary objects of the invention is the provision of a system for dyeing hosiery goods wherein pollution from wastes is substantially eliminated and conserve natural resources.

Another object of the invention is a hosiery goods dyeing process which eliminates dye bath and waste water discharge to municipal sewage facilities.

A further object of the invention is the provision of a system for dyeing hosiery wherein waste waters and unabsorbed dye baths are clarified sufficiently for recirculation and reuse in each operation or subsequent dyeing cycles.

Still another object of the invention is the provision of a dyeing system which is economical due to the reduction in water requirements, and due to the recirculation and reuse of chemical constituents, and in some cases reuse of dyes.

Another object of the invention is the provision of a dyeing system wherein the character of the dye bath waste, after dyeing hosiery goods, is analyzed and compared with a selected standard dye formula to determine the color and content of dyes that must be added to dye goods to obtain a desired shade in the next dyeing cycle or stage.

Other objects and advantages of the invention will be readily apparent to those skilled in the art during the course of the following detailed description.

DETAILED DESCRIPTION OF THE INVENTION

In the dyeing of hosiery goods, wastes are generated from the dye bath itself and from spent waste waters utilized in various rinsing and finishing operations. Various chemical agents or constituents are added to the dye bath, and to the finish water to give soft, full bodied hand to the hosiery articles and to aid in further processing of the hosiery.

Basically, three different types of dyes are used in hosiery dyeing. Such dyes consist of acid dyes, disperse dyes and basic dyes. The dye or dyes employed in a particular dyeing operation will vary depending upon the nature of fibrous materials being dyed, i.e., whether synthetic or natural fibers, and a number of manufacturing variables and preferences. Dyeing of the various yarns may be accomplished within a chamber or cabinet, a paddle machine or a rotary tub.

Figure 1:
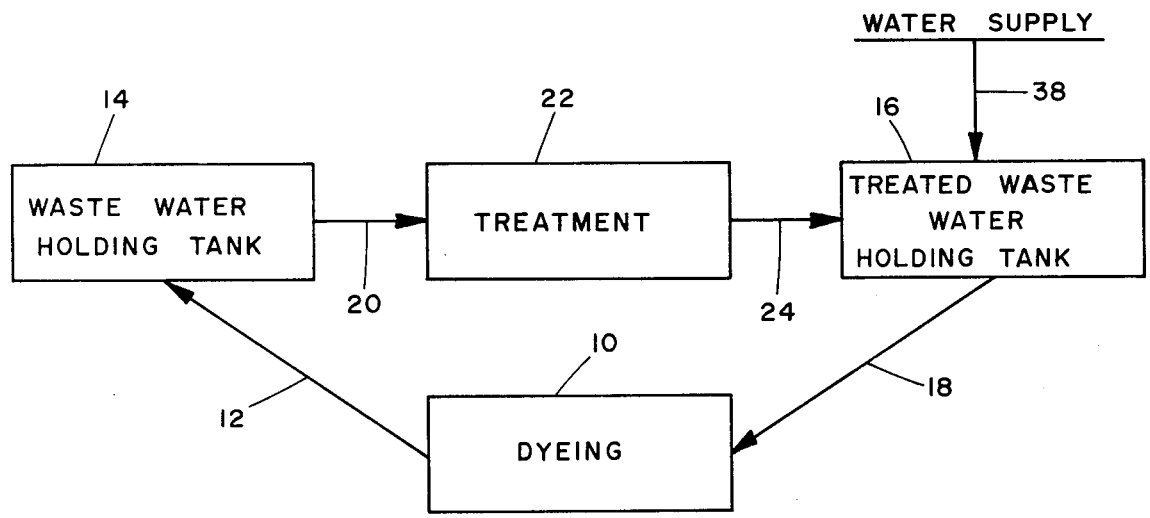
FIG. 1 is a schematic block diagram of one embodiment of the invention.

Referring to FIG. 1, the dyeing system of the present invention includes combining a first batch of hosiery articles with an appropriate dye bath in a dyeing machine or vat 10. The dye bath includes selected chemical agents and various dye colors at different concentrations. The appropriate dye bath is heated to a desired temperature in a conventional manner and the hosiery articles or goods dyed according to precribed procedure. Upon completion of the dyeing operation, the remaining dye bath unabsorbed by the hosiery goods is transferred through a conduit 12 to a waste water holding tank 14. If the amount of dye in the unabsorbed dye bath is not sufficiently great or valuable, it may not be feasible to analyze and reuse or recirculate the dye bath, and the unabsorbed dye bath is clarified periodically in a treatment zone. However, such dyes may be reused, if desired, as will be subsequently described.

Treated or clarified water from treated waste water holding tank 16 is directed through conduit 18 to the machine or vat 10 for rinsing of the hosiery goods to remove excess dye therefrom. A single rinsing operation may be possible, but generally two or more rinses are required to remove generally all traces of dyes in the rinse waters. After the first rinsing operation, the rinse waste water is directed through conduit 12 to the waste water holding tank 14. Additional rinsing operations, if required, are accomplished in the same manner with clarified water from tank 16 being transferred to vat 10 for rinsing of the goods and the rinse waste being transferred to the holding tank 14.

Upon sufficient rinsing of the goods, clarified water again is directed from holding tank 16 to the vat 10 for the finishing operation. Appropriate selected chemical agents are added to the water in vat 10 to improve the feel or hand of the goods, and also to improve the sewability and snag resistance of the hosiery goods. Upon proper finishing of the hosiery goods, the finish waste water is transferred through conduit 12 to waste holding tank 14.

The dyed hosiery goods, upon being rinsed and properly finished, are removed from the vat 10 in preparation for the dyeing of a second batch of goods.

In a dyeing cycle, a portion of the water is retained by the hosiery goods. This water must be replaced for the next dyeing cycle, and as desired or required clean water from a municipal water system may be directed through line 38 to the holding tank 16 or directly to the vat 10, for use as make-up water.

Periodically, waste waters in the holding tank 14 are directed via conduit 20 to a treatment zone or apparatus 22. In zone 22, the waste water may be treated by any one or combination of several processes, which include ozonation and electrolysis. In the treatment zone all or substantially all of the dyes are removed while at least portions of certain of the chemical agents are permitted to remain in the clarified or treated water depending on degree of treatment. The clarified water is directed through conduit 24 to holding tank 16 for subsequent recycling through the system as required. This process or dye cycle can be repeated indefinitely with the water recirculating in the closed loop. Therefore, savings in water and chemical costs are realized while eliminating waste discharge to a sewage system.

Figure 2:
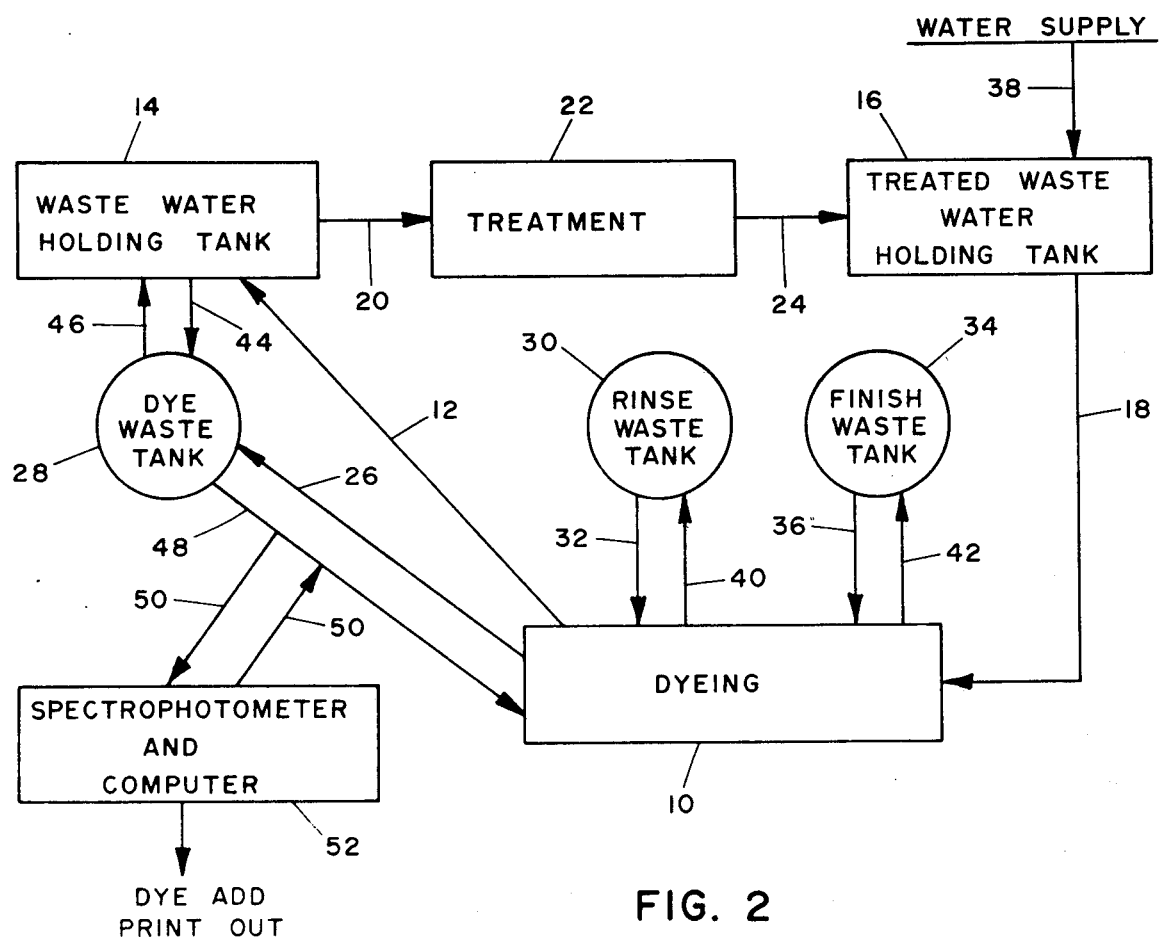
FIG. 2 is a schematic block diagram of another embodiment of the invention illustrating the cascading effect of the clarified water, reuse of the dye bath, and apparatus for analyzing the dye bath.

Referring to FIG. 2, upon dyeing of the goods within vat 10, the unabsorbed dye bath is transferred through conduit 26 to a dye waste tank 28 where it is retained for subsequent dyeing operations.

Water from rinse tank 30 is directed via conduit 32 to the machine or vat 10 for rinsing of the goods to remove excess dye therefrom. After the first rinsing operation, the rinse waste water is removed through conduit 12 to the waste water holding tank 14.

A second rinsing operation of the goods is accomplished by conveying water from a tank 34 through conduit 36 to the machine 10. Upon completion of the second rinse, the second rinse waste water is directed via conduit 40 to the rinse waste tank 30 and is retained there until used as the first rinse water in the following dyeing cycle.

Clean or clarified water next is directed to the hosiery goods in machine 10 through line 18 from the holding tank 16 or directly from a municipal water system through line 38. Appropriate selected chemical finishing agents are added. Upon completion of the finishing operation, the finish waste water flows through conduit 42 to finish waste tank 34.

Peridically, waste water in holding tank 14 is transferred through conduit 20 to a treatment zone 22, and subsequently through pipe 24 to the treated waste water holding tank 16. The clarified water can be periodically directed from holding tank 16 to the machine 10, via line 18, for the finish operation.

A conduit 44 is provided to permit specified amounts of the first rinse waste water to flow into the dye waste tank 28 as make-up water to maintain an operational level, as required. The dye waste in tank 28 may be directed periodically, if required, through conduit 46, tank 14 and conduit 20 to the treatment zone 22 for clarification.

Thus it can be seen that during the normal dyeing, first and second rinsing, and finishing operations, the clarified water cascades through the finishing and rinsing operations, progressively increasing in contaminants before finally reaching the waste waster holding tank 14. That is, finish waste water of a first dye cycle is used as the second rinse water in the next following dye cycle and the second rinse waste water is used as the first rinse water in the next or third dye cycle. During the dyeing operation, a portion of the dye bath is absorbed in the hosiery goods. The unabsorbed dye bath is removed and held in tank 28, and make-up water must be added to the dye bath to compensate for the loss prior to the dyeing of a subsequent batch of goods. The make-up water consists of waste water which flows through conduit 44 from tank 14. This make-up water includes a substanial quantity of dye and chemical agents, having been through previous finishing and rinsing operations, and therefore less dyes and chemicals are required to be added to the dye bath prior to dyeing bath a second batch of hosiery goods. Make-up water for the complete system is received from a water supply through conduit 38. In the embodiment of FIG. 1, dyes are removed in the treatment zone 22 while all chemicals are not removed depending on degree of treatment and can be recycled through the system.

The dye bath may be recirculated through unlimited or indefinite dyeing operations or cycles before being directed, if required, to the treatment zone 22. The cleanliness or quality of the dye bath is not significant and after a number of cycles or reuse, the character of the bath remains constant.

A small amount of the dye bath directed from the dye waste tank 28 back to the machine 10 via line 38 for a subsequent dyeing cycle is diverted through line 50 and analyzed by instrumentation 52 to determine the quanties and colors of the various dyes that must be added to result in a desired dye shade of the hosiery goods. For analyzing the dye bath, the instrumentation 54 may comprise a microprocessor including a spectrophotometer with a computer and printer of the type manufactured by Process Analyzers, Inc., 1101 State Street, Princeton, New Jersey. The spectrophotometer reads the various colors in the dye bath, for example, red, blue and yellow, and such information enters the computer, which has been programmed with a specific standard dye formula. The computer will compare the dye formula with the dye bath and the printer will print out the quantity and colors of the dyes that must be added to the bath to dye the specific shade programmed in the computer. Also, the computer may be programmed to automatically measure and control dyes to be added through conventional chemical feeders.

The waste water in zone 22, in each of FIGS. 1 and 2, may be treated by any one or combination of several systems. Preferably the water is treated by electrolysis or ozonation. Although not shown, the treated waste water may be directed through a filter to substantially remove suspended solids thereform, prior to entering the treated waste water holding tank.

While not illustrated on the drawing, it is to be understood that appropriate valves and pumps are provided for directing or transferring the various fluids to and from the vat 10, the treatment zone, and the various tanks.

In each of the systems illustrated, the hosiery goods can be dyed various shades, that is, go from dark to light shades or from light to dark shades using the dye bath or treated waste from a previous dyeing operation, as long as the entire hosiery article or garment is to be dyed with a single dye formula.

What is claimed is:

1. In the dyeing of textile hosiery goods wherein batches of goods are sequentially subjected to dyeing cycles including dyeing, rinsing and finishing operations while continuously reusing and recycling water, dyes and chemicals in consecutive dyeing cycles to eliminate waste discharge, the method of; combining within a dye vat, a first batch of hosiery goods to be dyed and an appropriate dye bath including water, dyes and chemicals, dyeing the hosiery goods, removing the unspent dye bath from the vat and directing the unspent dye bath to a dye bath waste holding tank, rinsing the dyed hosiery goods by directing clarified waste water from a previous dyeing cycle to the vat, transferring the rinse waste water from the vat to a waste water holding tank, applying a finish to the dyed and rinsed goods by combining appropraite chemicals and clarified waste water with the hosiery goods within the vat, transferring the finish waste water to the holding tank, periodically directing waste water in the waste water holding tank to a treatment zone, clarifying the waste waters in the treatment zone by removing dyes therefrom while permitting at least certain chemicals to remain therein for reuse when the clarified waste water is utilized in subsequent dyeing cycles, removing the dyed goods from the vat, transferring the unspent dye bath in the dye waste holding tank back to the dye vat for dyeing a subsequent batch of hosiery goods, and repeating the above steps.

2. The method as recited in claim 1 wherein the waste waters are clarified periodically by ozonation.

3. The method as recited in claim 1 wherein the waste waters are clarified by electrolysis.

4. In a hosiery dyeing operation wherein the hosiery goods are placed within a vat and subjected to dyeing, rinsing and finishing operations the method of continuously recirculating the dye bath and rinsing and finishing waste waters for reuse in subsequent dyeing cycles while eliminating discharge to municipal sewage facilities comprising the steps of: combining hosiery goods and a dye bath including water, dyes and chemicals within the vat; dyeing the hosiery goods, transferring the dye bath unabsorbed by the hosiery goods to a dye waste holding tank, rinsing the dyed goods within the vat by subjecting the goods to unclarified and untreated waste water from a finishing operation in a prior dyeing cycle, transferring the rinsing waste water to a waste water holding tank after rinsing of the goods, applying a finish to the goods within the vat by subjecting the goods to chemcials combined with treated, clarified waste water, transferring the finish waste water to a waste water holding tank for use as a rinse water in the subsequent dyeing cycle, and clarifying the waste rinse water for use in a finishing operation in the subsequent dyeing cycle, removing the dyed goods from the vat, and directing the unabsorbed dye bath from the dye waste holding tank back to the vat for dyeing hosiery goods in the subsequent dyeing cycle.

5. The method as recited in claim 4, and further including subjecting the goods within the vat to a second rinse water bath prior to applying the finish to the goods.

6. The method as recited in claim 5, wherein the treated, clarified waste waters are transferred to a treated water holding tank, and periodically directing, as required, a predetermined quantity of clarified water and chemicals to the vat for applying a finish to hosiery goods dyed in the subsequent dyeing cycle.

7. The method as recited in claim 5, wherein the finish waste water in a first dyeing cycle is utilized as rinse water during the next following cycle, and again as a rinse water during a third dyeing cycle prior to being clarified.

8. The method as recited in claim 4, and further including the step of directing waste rinse water to supplement the dye bath, as required.

9. The method as recited in claim 4, wherein upon transferring of the dye bath unabsorbed by the hosiery goods to the dye bath waste tank, and upon completion of the rinsing and finishing operations, the step of analyzing the unabsorbed dye bath to determine quantities and colors of dyes to be added to the unabsorbed dye bath to achieve the desired shade of goods dyed in a subsequent dyeing cycle.

10. The method as recited in claim 9, and further including comparing the dye colors and quantities in the unabsorbed dye bath with a specific dye formula to determine colors and quantities of dyes that must be added to the unabsorbed dye bath to result in a desired shade of hosiery goods, corresponding to the dye formula, in the subsequent hosiery dyeing cycle.

11. In the dyeing of textile hosiery goods in a vat, the method of continuously recirculating a dye bath to and from the vat to sequentially dye batches of hosiery goods the same shade or varying shades, as desired, in subsequent dyeing cycles, comprising the steps of; combining within the vat, a first batch of hosiery goods to be dyed in a dye bath having predetermined quantities and colors of dyes corresponding to a selected dye formula to result in dyed goods of a selected shade, dyeing a first batch of hosiery goods, transferring the unabsorbed dye bath to a holding tank and retaining the unabsorbed dye bath therein until until transferred back to the dye vat, sequentially rinsing and applying a finish to the dyed goods within the vat by using clarified waste waters, transferring the waste rinse and finish waters to a waste water holding tank, and periodically treating the waste waters to obtain clarified water for use in subsequent dyeing cycles, removing the first batch of dyed goods from the vat, analyzing the unabsorbed dye bath to determine the dye colors and quantities remaining in the unabsorbed dye bath, transferring the unabsorbed dye bath from the dye bath holding tank to the dye vat prior to dyeing a second batch of hosiery goods within the vat, comparing the unabsorbed dye bath with a prescribed dye formula to be used in dyeing a second batch of hosiery goods, determining the quantities and colors of dyes that must be added to the remaining unabsorbed dye bath to result in the second batch of hosiery goods being dyed a preselected shade corresponding to the prescribed dye formula, adding dyes to the remaining unabsorbed dye bath, and dyeing the second batch of hosiery goods within the vat to the shade corresponding to the preselected dye formula.

12. In the dyeing of textile hosiery goods as recited in claim 11, wherein at least portions of the remaining, unabsorbed dye bath is analyzed as it is being transferred from the holding tank to the dyeing vat.

13. In a system for dyeing hosiery goods by continuously recirculating the dye bath and waste waters wherein the hosiery goods are subjected to dyeing, rinsing and finishing operations; a receptacle for receiving therein a dye bath and a first batch of hosiery goods to be dyed, means for receiving and retaining the dye bath unabsorbed by the first batch of hosiery goods as the bath is transferred from said receptacle after a dyeing operation, first and second waste water tanks, means for directing waste water from one of said first and second tanks to said receptacle for initially rinsing dyed goods within said receptacle, means for receiving the spent waste water after rinsing of the first batch of dyed goods, means for directing waste water from the other of said first and second waste water tanks to said receptacle for a second rinsing operation, means for conveying said waste water from the second rinsing operation to said other of said first and second waste water tanks for use in subsequently initially rinsing a second batch of goods in a subsequent dyeing cycle, means for clarifying waste water received by said means for receiving spent waste water from at least the initial rinsing operation, means for supplying clarified water to said receptacle having said first batch of hosiery goods therein, and means for analyzing the dye color and content of the dye bath transferred from said receptacle and comparing the color and content with a specific dye formula prior to dyeing of a second batch of hosiery goods within a said receptacle a particular shade corresponding to said specific dye formula.

* * * * *